United States Patent
Angel

(10) Patent No.: US 11,047,365 B2
(45) Date of Patent: Jun. 29, 2021

(54) SYSTEM AND METHOD FOR DETECTING WIND TURBINE ROTOR BLADE STUCK CONDITION BASED ON RUNNING STATISTIC

(71) Applicant: General Electric Company, Schenectady, NY (US)

(72) Inventor: Mathew Doyle Angel, Greenville, SC (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 16/171,500

(22) Filed: Oct. 26, 2018

(65) Prior Publication Data
US 2020/0132051 A1    Apr. 30, 2020

(51) Int. Cl.
  F03D 17/00    (2016.01)
  F03D 7/02     (2006.01)
  F03D 7/04     (2006.01)

(52) U.S. Cl.
  CPC ............ *F03D 17/00* (2016.05); *F03D 7/0208* (2013.01); *F03D 7/0276* (2013.01); *F03D 7/043* (2013.01); *F05B 2200/14* (2013.01); *F05B 2260/80* (2013.01); *F05B 2270/101* (2013.01); *F05B 2270/107* (2013.01); *F05B 2270/327* (2013.01); *F05B 2270/329* (2013.01); *F05B 2270/70* (2013.01)

(58) Field of Classification Search
  CPC ...... F03D 17/00; F03D 7/0208; F03D 7/0276; F03D 7/043; F05B 2200/14; F05B 2260/80; F05B 2270/101; F05B 2270/107; F05B 2270/327; F05B 2270/329; F05B 2270/70
  See application file for complete search history.

(56) References Cited

U.S. PATENT DOCUMENTS

| | | | |
|---|---|---|---|
| 7,445,420 B2 | 11/2008 | Yoshida | |
| 7,728,452 B2 | 6/2010 | Arinaga et al. | |
| 8,100,628 B2 | 1/2012 | Frese et al. | |
| 8,680,700 B2 | 3/2014 | Gomez De Las Heras Carbonell et al. | |
| 8,749,084 B2 | 6/2014 | Gjerlov et al. | |

(Continued)

FOREIGN PATENT DOCUMENTS

EP     2 886 856 A1    6/2015

OTHER PUBLICATIONS

Lu et al. 'Condition Monitoring and Fault Diagnostics of Wind Turbines' 2010 Prognostics & System Health Management Conference, IEEE (2010).*

(Continued)

*Primary Examiner* — Bernard G Lindsay
(74) *Attorney, Agent, or Firm* — Dority & Manning, P.A.

(57) ABSTRACT

A method for detecting when a rotor blade of a wind turbine is stuck is described. The method can include monitoring, via a controller, a speed of rotation of the wind turbine, and, determining, via the controller, a running average of the speed of rotation. The method further includes applying, via the controller, at least one filtering operation to the running average to obtain a filtered value, and, determining, via the controller, a stuck condition of one or more rotor blades of the wind turbine based on the filtered value. The method can also include performing a control operation to reduce loading on the wind turbine based on the stuck condition.

17 Claims, 6 Drawing Sheets

(56) References Cited

U.S. PATENT DOCUMENTS

| | | |
|---|---|---|
| 9,371,819 B2 | 6/2016 | Grabau |
| 9,416,771 B2 | 8/2016 | Obrecht et al. |
| 2009/0066089 A1 | 3/2009 | Arinaga et al. |
| 2009/0081041 A1 | 3/2009 | Frese et al. |
| 2010/0314875 A1* | 12/2010 | Grant .................. F03D 7/0212 290/44 |
| 2013/0121825 A1* | 5/2013 | Miranda ............... F03D 7/0224 416/1 |
| 2014/0167415 A1* | 6/2014 | Mykhaylyshyn ..... F03D 7/0204 290/44 |
| 2014/0271181 A1* | 9/2014 | Perley .................... F03D 17/00 416/1 |
| 2015/0377215 A1* | 12/2015 | Agarwal ............... F03D 7/0212 416/1 |
| 2017/0226989 A1* | 8/2017 | Hammerum ............ F03D 7/045 |
| 2018/0058424 A1* | 3/2018 | Egedal .................. F03D 7/0228 |
| 2019/0154001 A1* | 5/2019 | Ostergaard .............. F03D 7/042 |

OTHER PUBLICATIONS

Ziaja et al. 'Fault detection in rolling element bearings using wavelet-based variance analysis and novelty detection' Journal of Vibration and Control 2016, vol. 22(2) 396-411 SAGE.*
U.S. Appl. No. 16/037,529, filed Jul. 17, 2018.
U.S. Appl. No. 15/984,936, filed May 21, 2018.
European Search Report, dated Apr. 1, 2020 for EP Application No. 19205663.8.

* cited by examiner

SYSTEM AND METHOD FOR DETECTING WIND TURBINE ROTOR BLADE STUCK CONDITION BASED ON RUNNING STATISTIC

FIELD

The present disclosure relates generally to wind turbines.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers the wind turbine may change. The wind turbine may thus adjust the nacelle through, for example, a yaw adjustment about a longitudinal axis of the tower to maintain alignment with the wind direction. In addition, when the wind turbine is parked or idling, conventional control strategies include actively tracking the wind direction to provide better alignment to the wind direction so as to minimize start-up delays when the wind speed increases or decreases back into the operating range.

However, in a situation where the wind turbine is faulted and one of the rotor blades becomes stuck (unlike the normal idling situation), there are limited benefits to tracking the wind. In addition, in such situations, the wind turbine can experience increased loads due to the stuck rotor blade, as well as rotor imbalance, due to a "paddling" condition.

Paddling is a phenomenon that can occur when a wind turbine is idling with a stuck blade and has some yaw misalignment from the incoming wind direction. Due to this misalignment, the angle of attack of the stuck blade changes with rotor position. This can result in a large spike in rotor/generator speed and is undesirable for loads.

BRIEF DESCRIPTION

Aspects and advantages of the invention will be set forth in part in the following description, or may be obvious from the description, or may be learned through practice of the invention.

One example aspect of present disclosure is directed to a method for detecting when a rotor blade of a wind turbine is stuck. The method can include monitoring, via a controller, a speed of rotation of the wind turbine, and, determining, via the controller, a running average of the speed of rotation. The method further includes applying, via the controller, at least one filtering operation to the running average to obtain a filtered value, and, determining, via the controller, a stuck condition of one or more rotor blades of the wind turbine based on the filtered value. The method can also include performing a control operation to reduce loading on the wind turbine based on the stuck condition.

Another example aspect of the present disclosure is directed to a system for detecting when a rotor blade of the wind turbine is stuck. The system can include at least one sensor configured for monitoring a rotational speed of the wind turbine, and, a controller communicatively coupled to the at least one sensor. The controller can include at least one processor configured to perform one or more operations. The one or more operations can include monitoring a speed of rotation of the wind turbine, determining a running average of the speed of rotation, applying at least one filtering operation to the running average to obtain a filtered value, determining a stuck condition of one or more rotor blades of the wind turbine based on the filtered value, and, performing a control operation to reduce loading on the wind turbine based on the stuck condition.

Yet another example aspect of the present disclosure is directed to a method for detecting when a rotor blade of a wind turbine is stuck. The method can include monitoring, via a controller, a speed of rotation of the wind turbine, and, determining, via the controller, a running average of the speed of rotation. The method can also include applying, via the controller, a first filtering operation to the running average to obtain a first filtered value, and, applying, via the controller, a second filtering operation to the first filtered value to obtain a second filtered value. The method can also include determining, via the controller, a stuck condition of one or more rotor blades of the wind turbine based on the second filtered value, and, performing a control operation to reduce loading on the wind turbine based on the stuck condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
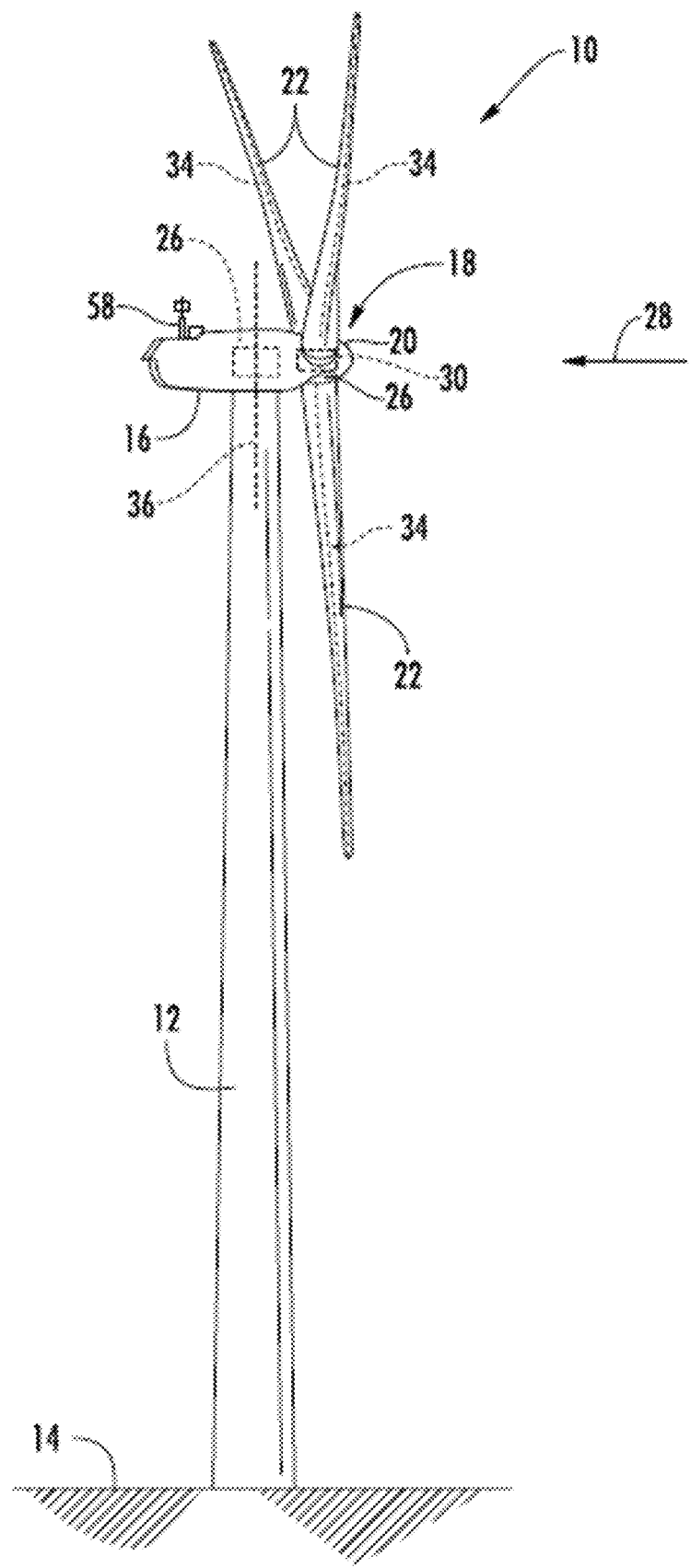
FIG. 1 illustrates a perspective view of a wind turbine according to example embodiments of the present disclosure.

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Paddling is a phenomenon that can occur when a wind turbine is idling with a stuck blade and has some yaw misalignment from the incoming wind direction. Due to this misalignment, the angle of attack of the stuck blade changes with rotor position. This can result in a large spike in rotor/generator speed and is undesirable for loads. According to example embodiments, a method for monitoring wind turbines provides for detecting of paddling, and implementation of control operations to reduce these loads.

The methods can include monitoring a speed of rotation of the wind turbine. The speed may be averaged over a desired window of time. The averaged speed may then be filtered at least once to determine if paddling or a stuck blade condition exists. For example, the filtering may include filtering based on a speed threshold, a coefficient of variance, or another suitable filtering operation. Upon filtering to accurately determine if paddling is occurring, the methods can include performing a control operation to reduce loads.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
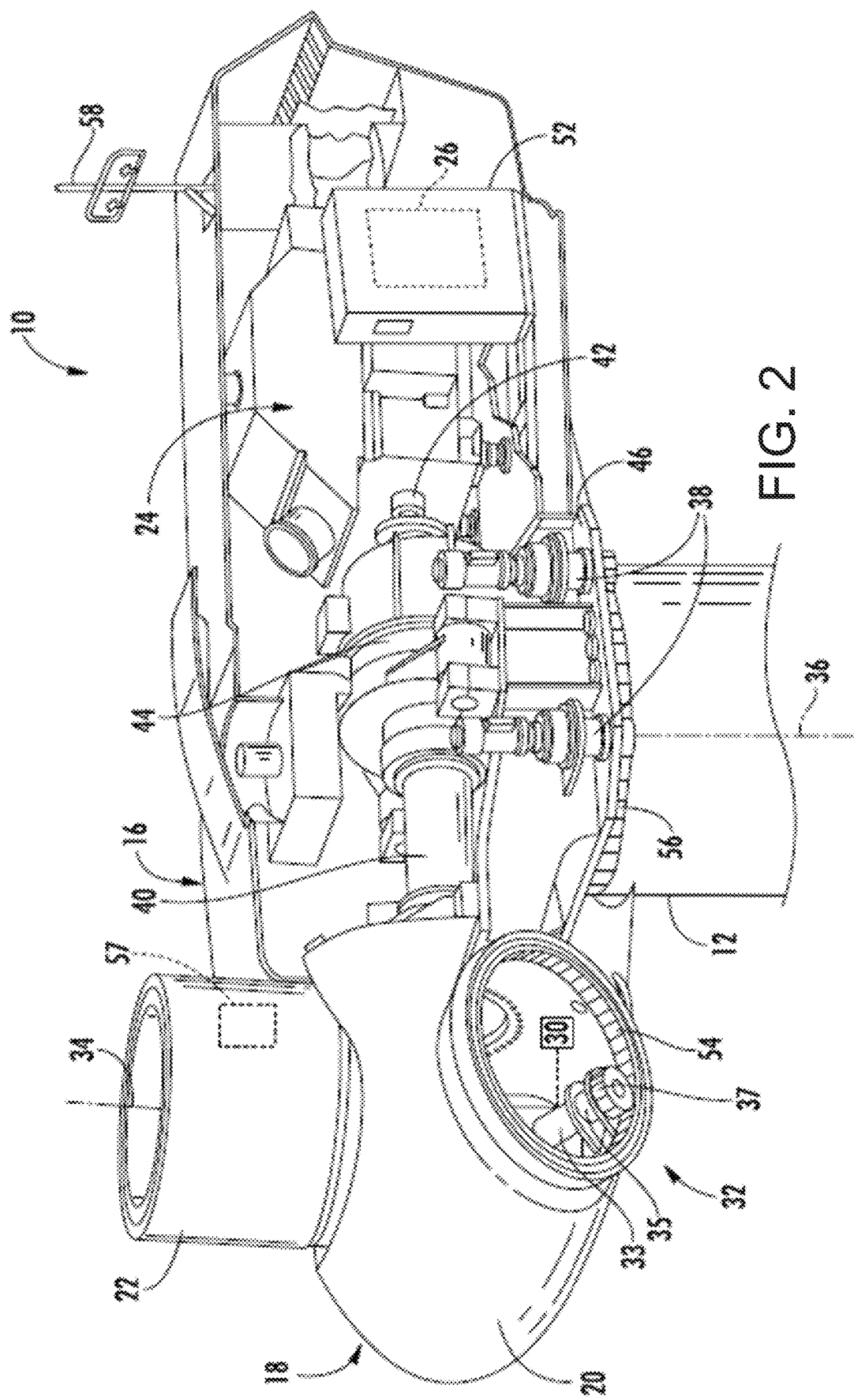
FIG. 2 illustrates a perspective, internal view of a nacelle of a wind turbine according to example embodiments of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks 48, 50 mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

In addition, as shown in FIG. 2, one or more sensors 57, 58 may be provided on the wind turbine 10. More specifically, as shown, a blade sensor 57 may be configured with one or more of the rotor blades 22 to monitor the rotor blades 22. It should also be appreciated that, as used herein, the term "monitor" and variations thereof indicates that the various sensors of the wind turbine 10 may be configured to provide a direct measurement of the parameters being monitored or an indirect measurement of such parameters. Thus, the sensors described herein may, for example, be used to generate signals relating to the parameter being monitored, which can then be utilized by the controller 26 to determine the condition.

Further, as shown, a wind sensor 58 may be provided on the wind turbine 10. The wind sensor 58, which may for example be a wind vane, and anemometer, and LIDAR sensor, or another suitable sensor, may measure wind speed and direction. As such, the sensors 57, 58 may further be in communication with the controller 26, and may provide related information to the controller 26. For example, yawing of the wind turbine 10 may occur due to sensing of changes in the wind direction 28, in order to maintain alignment of the wind turbine 10 with the wind direction 28. In addition, yawing of the wind turbine 10 may occur due to determining a stuck blade condition, which is described in more detail herein.

Further, the turbine controller 26 may also be communicatively coupled to various components of the wind turbine 10 for generally controlling the wind turbine 10 and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Further, as the direction 28 of the wind changes, the turbine controller 26 may be configured to control a yaw angle of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the nacelle 16 may be rotated about the yaw axis 36 via a yaw bearing 56.

Still referring to FIG. 2, each rotor blade 22 may also include a pitch adjustment mechanism 32 configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34.

As such, the turbine controller 26 may be communicatively coupled to each pitch adjustment mechanism 32 of the wind turbine 10 (one of which is shown) through a pitch controller 30 for controlling and/or altering the pitch angle of the rotor blades 22 (i.e., an angle that determines a perspective of the rotor blades 22 with respect to the direction 28 of the wind). For instance, the turbine controller 26 and/or the pitch controller 30 may be configured to transmit a control signal/command to each pitch adjustment mechanism 32 such that the pitch adjustment mechanism(s) 32 adjusts the pitch angle of the rotor blades 22 as described herein. The turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 of the wind turbine, or by directly controlling the operation of the plurality of pitch drives or pitch adjustment mechanisms.

Figure 3:
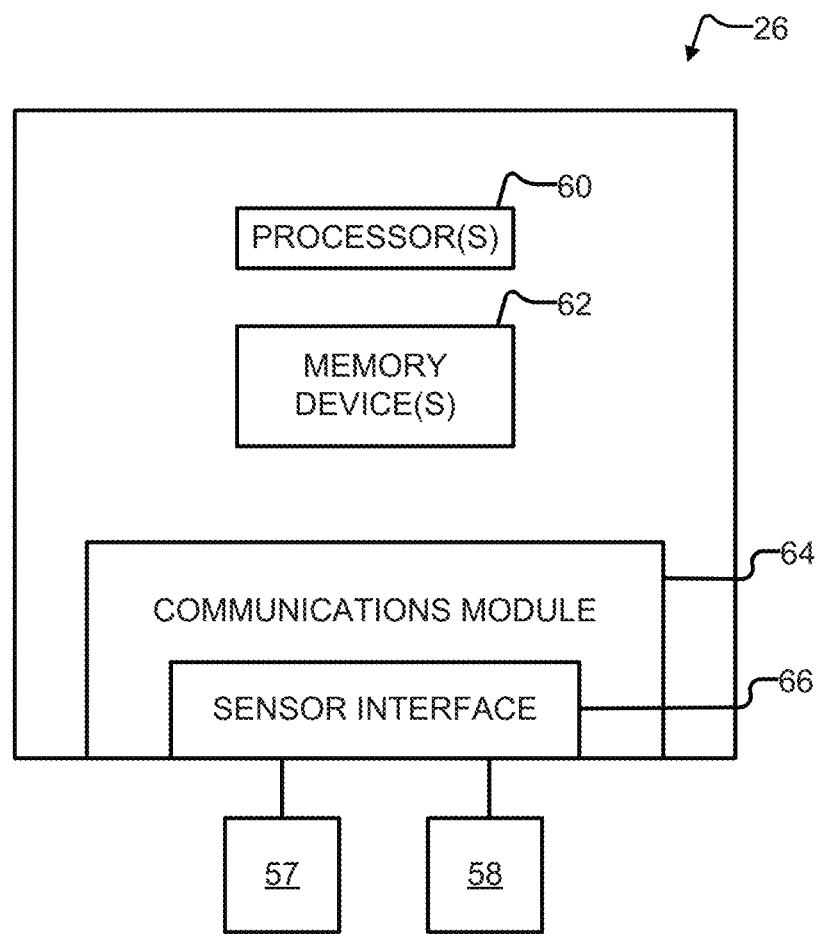
FIG. 3 illustrates a schematic diagram of example suitable components that may be included in a wind turbine controller according to example embodiments of the present disclosure.

Referring now to FIG. 3, there is illustrated a block diagram of one embodiment of suitable components that may be included within the controller 26 according to the present disclosure. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from one or more sensors 57, 58 to be converted into signals that can be understood and processed by the processors 60. It should be appreciated that the sensors 57, 58 may be communicatively coupled to the communications module 64 using any suitable means. For example, as shown in FIG. 3, the sensors 57, 58 are coupled to the sensor interface 66 via a wired connection. However, in other embodiments, the sensors 57, 58 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

As discussed above, a wind turbine 10, such as the nacelle 16 thereof, may rotate about the yaw axis 36 as required. In particular, rotation about the yaw axis 36 may occur due to changes in the wind direction 28, such that the rotor 18 is aligned with the wind direction 28. For example, when the wind turbine 10 is in an idling state, the controller 26 actively tracks the wind direction to provide better alignment to the wind and minimize start-up delays when the wind speed increases or decreases back into the operating range. However, in a situation where the wind turbine 10 is in an idling or parked state and one or more of the rotor blades 22 becomes stuck, there are limited benefits to tracking the wind. Thus, in such situations, the turbine controller 26 is configured to implement a control operation to reduce the drag force on the faulted rotor blade so as to reduce loads thereon and/or to prevent rotor imbalance.

Figure 4:
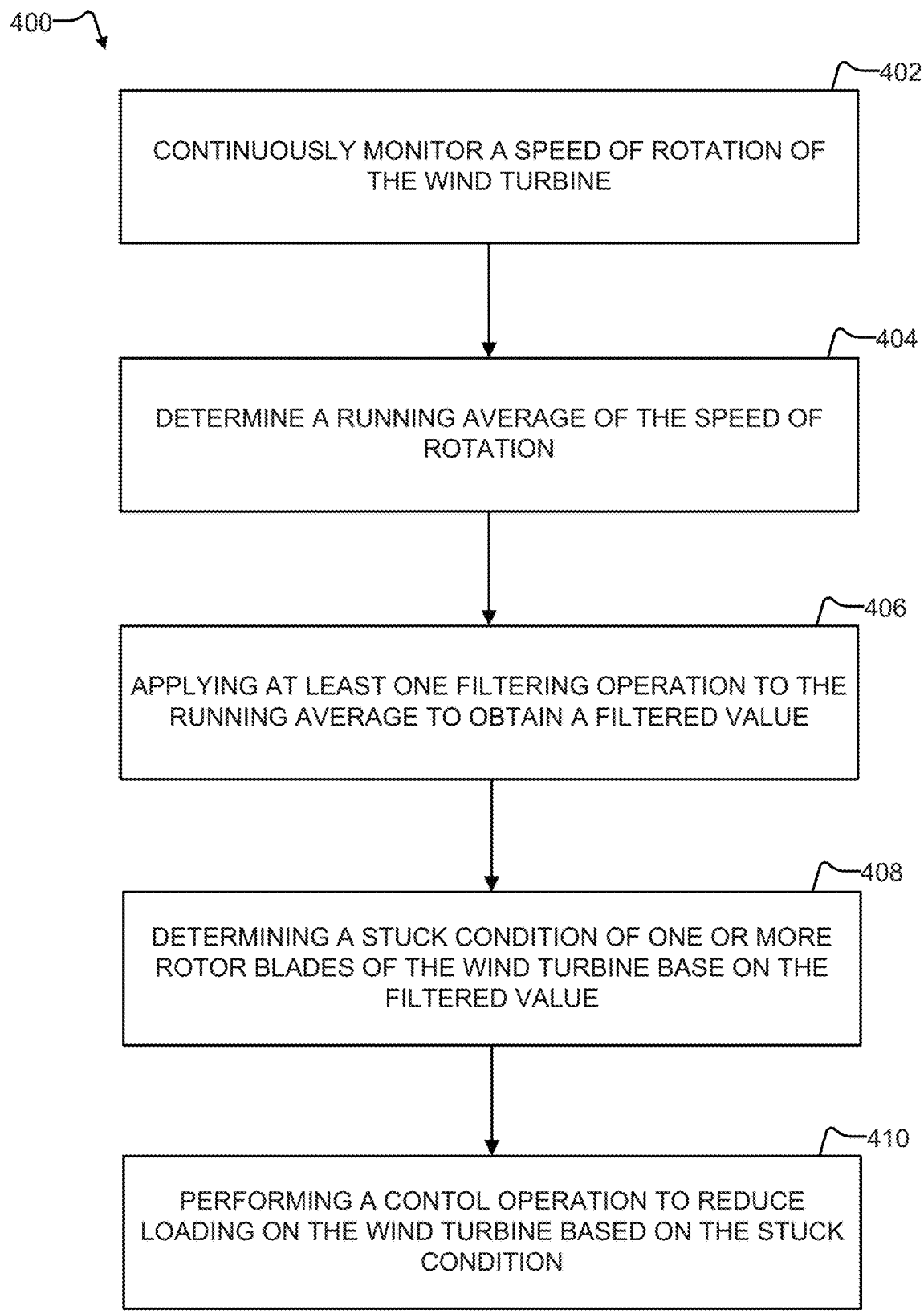
FIG. 4 illustrates a flow diagram of a method for monitoring a wind turbine according to example embodiments of the present disclosure.

More specifically, as shown in FIG. 4, a flow diagram of one embodiment of a method 400 for monitoring the wind turbine 10 in situations where the wind turbine 10 is in an idling or parked state and one or more of the rotor blades 22 becomes stuck. In general, the method 400 will be described herein with reference to the wind turbine 10 shown in FIGS. 1 and 2, as well as the various controller components shown in FIG. 3. However, it should be appreciated that the disclosed method 400 may be implemented with wind turbines having any other suitable configurations and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 402, the method 400 includes monitoring, via the controller 26, a speed of rotation of the wind turbine 10. For example, using one or more of the sensors 57 and 58, the controller 26 may monitor a speed of rotation of the wind turbine 10. The monitored speed may be cached or stored so as to facilitate further operations, including filtering operations, such that paddling or stuck blade conditions may be accurately determined.

The method 400 may further include determining a running average or running statistic of the speed of rotation of the wind turbine 10, at block 404. The running average may be a running, windowed mean and standard deviation. The size of the window may vary. According to at least one embodiment, the size of the window is approximately 5 minutes. According to other embodiments, the size of the window is variable.

Generally, at each monitored point, comparing how many standard deviations the raw monitored speed deviates from the mean can provide a measure of how "spikey" the data is. Accordingly a threshold can be set to flag spikes of a certain size. As shown at 406, the method 400 can include applying at least one filtering operation to the running average to obtain a filtered value. Thus, the at least one filtering operation can include a threshold based on a raw speed value, to identify spikes as explained above. Alternatively, the at least one filtering operation can be based at least in part on a threshold of a coefficient of variance in the running average.

It should be understood that the at least one filtering operation can include two or more filtering operations. According to one example, the first filtering operation includes filtering the running average to determine if the speed has exceeded a raw speed value or speed threshold. According to this example, the second filtering operation includes a coefficient of variance (CV). CV is the standard deviation divided by the mean (e.g., a windowed μ and σ). This is an indication of large variance in data relative to the magnitude of data itself. Generally, CV may be denoted as follows:

$$CV = \frac{\sigma_{\omega*time}}{\mu_{\omega*time}} \quad \text{(Equation 1)}$$

wherein time denotes the size of the window where monitoring is being taken.

Thereafter, and as shown at 408, the method 400 can include determining a stuck condition of one or more rotor blades 22 of the wind turbine 10 based on the filtered value. As used herein, the phrase "stuck condition" refers to a condition where a wind turbine has a rotor blade which is stuck or immovable. The stuck condition may have resulted from damage to the blade itself, or from an issue in the pitch adjustment mechanism 32. The pitch adjustment mechanism issue may arise from the pitch drive motor 33, the pitch drive gearbox 35, and/or the pitch drive pinion 37. Accordingly, the "stuck condition" may include any scenario where a rotor blade is stuck. For example, when the wind turbine 10 is shutdown during an extreme wind situation and also has a stuck rotor blade 22, the blade 22 can experience a "paddling" effect that provokes high loads in the blade structure as well as the tower base bending moment. As further illustrated in FIG. 5, the paddling effect occurs at low rotor speeds 72 (e.g. the wind turbine 10 is shutdown but the rotor 18 is spinning slowly or idling) when the rotor 18 approaches the zero-degree position 74 and wind hits the wind turbine 10 while the rotor 18 deaccelerates rapidly, causing high loading 76 (as shown by the peaks or "spikes" in FIG. 5) in both the rotor blades 22 and/or the tower 12 of the wind turbine.

Figure 5:
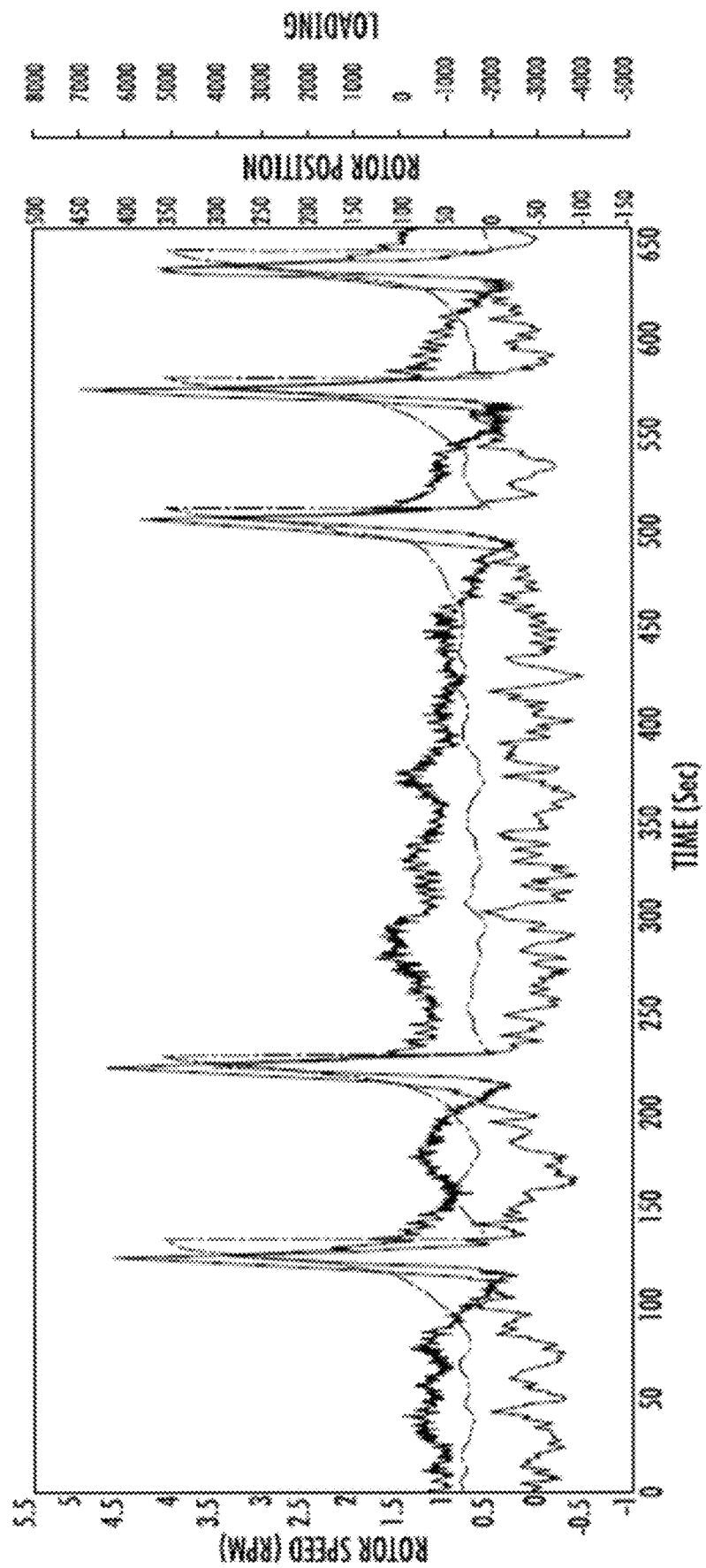
FIG. 5 illustrates a graph of the paddling effect of a rotor blade of a wind turbine according to example embodiments of the present disclosure.
Figure 6:
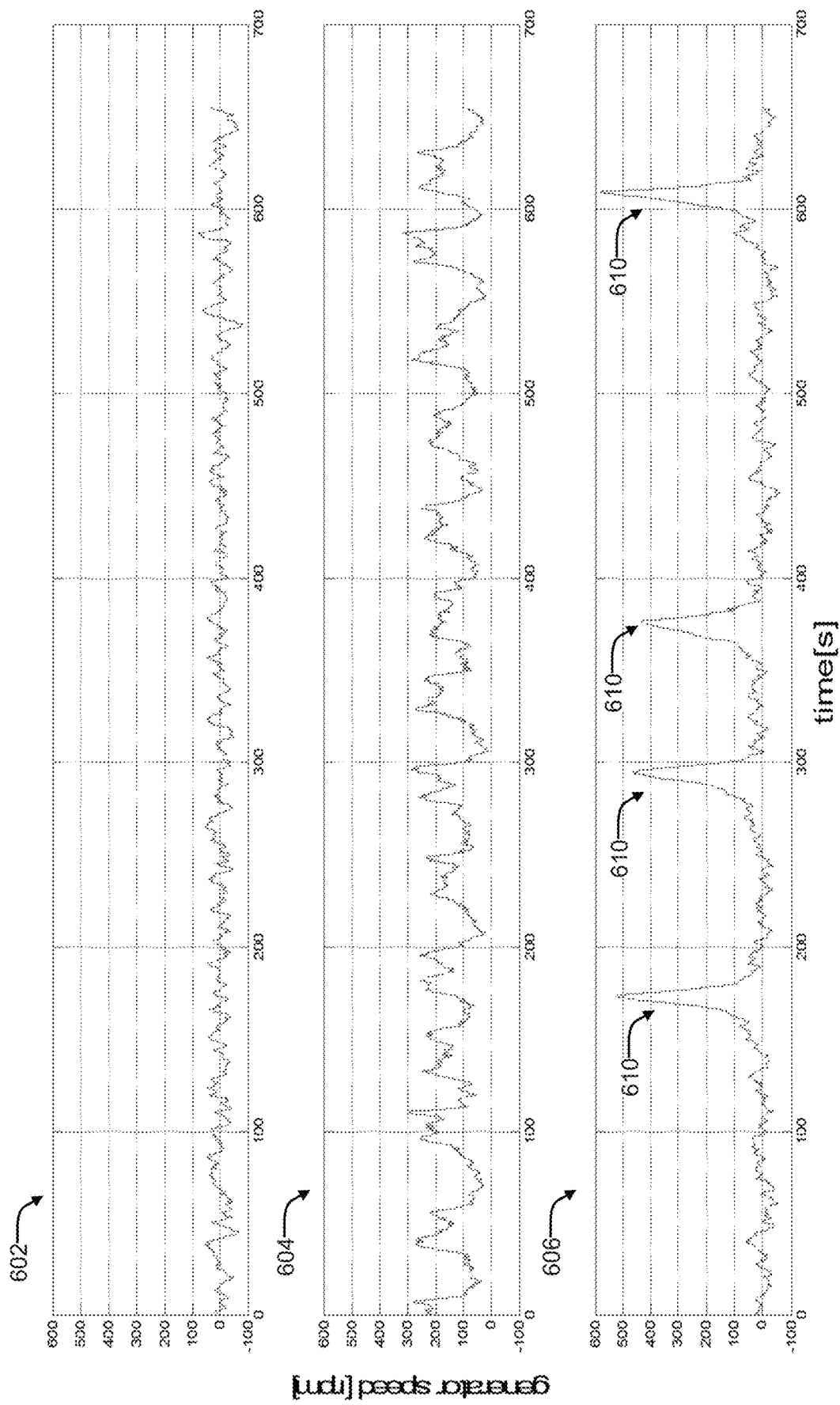
FIG. 6 illustrates graphs of example speed profiles that may be filtered to determine the paddling effect of FIG. 5 according to example embodiments the present disclosure.

Generally, the peaks or "spikes" in FIG. 5 can be determined through filtering of the running average as described above. More specifically, as illustrated in FIG. 6, three raw speed profiles 602, 604, and 606 are presented. The speed profiles 602 and 604 depict some relatively minor peaks with no paddling. However, the speed profile 606 shows peaks 610 readily associated with paddling.

In this example, through application of a first filtering operation based at least in part on a threshold of a raw speed value, the first speed profile 602 is determined to not include a stuck condition. However, the second speed profile 604 may still be considered. Application of the second filtering operation, based at least in part on the CV described above, the second speed profile 604 may be determined to not include the stuck condition. For example, the second speed profile 604 has a higher mean than standard deviation, where CV<1. Finally, the stuck condition of 408 can be easily identified in the third speed profile 606. For example, the third speed profile 606 has a larger standard deviation than mean, wherein CV>1. It is noted that the first and second filtering operations may be reversed such that the CV is applied as a first filtering operation, and a speed threshold is applying as a second filtering operation, in some implementations.

As a partial summary, application of the filtering operations may take the form of first determining if:

$$\frac{\mu_{\omega*time} - \omega}{\sigma_{\omega*time}} > Z_{th} \quad \text{(Equation 2)}$$

or that the speed profile exceeds the speed threshold. Finally, second determining of $CV < CV_{th}$ and $\omega > \omega_{th}$ indicates a speed profile similar to profile 606, wherein paddling or a stuck blade condition has been detected. CV is the standard deviation divided by the mean (e.g., a windowed μ and σ). $Z_{th}$ is the speed threshold. Furthermore, $\omega_{th}$ is frequency. Generally, $Z_{th}$, $C_{Vth}$, and $\omega_{th}$ can all be selected to set a detection boundary as three different general categories of speed profile (e.g., 602, 604, 606) blend together at varying conditions.

Thus, the method 400 can accurately determine the stuck blade condition at block 408. The method 400 also includes, at 410, performing a control operation to reduce loading on the wind turbine 10 based on the stuck condition.

For example, if a stuck condition of one or more blades is determined, control operation can include yawing the nacelle 16 of the wind turbine 10 away from the incoming wind direction 28. More specifically, in one embodiment, the controller 26 may be configured to yaw the nacelle 16 by continuously providing different yaw angles to the yaw drive mechanisms 38 of the wind turbine 10 based on the stuck condition. Other control operations may also be used, according to any desired implementation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting when a rotor blade of a wind turbine is stuck, the method comprising:
   idling the wind turbine, wherein the wind turbine has a yaw misalignment relative to an incoming wind direction;
   monitoring, via a controller, a speed of rotation of the wind turbine;
   determining, via the controller, a running statistic of the speed of rotation;
   applying, via the controller, at least one filtering operation to the running statistic to obtain a filtered value, wherein the at least one filtering operation comprises comparing the running statistic of the speed of rotation to a threshold of a coefficient of variance in the running statistic of the speed of rotation;
   determining, via the controller, a stuck condition of one or more rotor blades of the wind turbine based on the filtered value; and
   performing a control operation to reduce loading on the wind turbine based on the stuck condition.

2. The method of claim 1, wherein the at least one filtering operation is based at least in part on a raw speed threshold for the running statistic.

3. The method of claim 1, wherein the at least one filtering operation is a first filtering operation, and wherein the method further comprises:
applying, via the controller, a second filtering operation to the running statistic.

4. The method of claim 3, wherein the first filtering operation is based at least in part on a threshold of a coefficient of variance in the running statistic.

5. The method of claim 4, wherein the second filtering operation is based at least in part on a raw speed threshold for the running statistic.

6. The method of claim 1, wherein the control operation comprises yawing, via the controller, the nacelle of the wind turbine away from an incoming wind direction.

7. The method of claim 4, wherein yawing the nacelle of the wind turbine further comprises continuously providing different yaw angles to one or more yaw drive mechanisms of the rotor blade.

8. The method of claim 1, wherein monitoring the speed of rotation of the wind turbine comprises continuously monitoring the speed of rotation of the wind turbine.

9. A system for detecting when a rotor blade of the wind turbine is stuck, the system comprising:
at least one sensor configured for monitoring a rotational speed of the wind turbine;
a controller communicatively coupled to the at least one sensor, the controller comprising at least one processor configured to perform one or more operations, the one or more operations comprising:
monitoring a speed of rotation of the wind turbine while the wind turbine is idling and has a yaw misalignment relative to an incoming wind direction;
determining a running average of the speed of rotation;
applying at least one filtering operation to the running average to obtain a filtered value, wherein the at least one filtering operation comprises comparing the running average of the speed of rotation to a threshold of a coefficient of variance in the running average of the speed of rotation;
determining a stuck condition of one or more rotor blades of the wind turbine based on the filtered value; and
performing a control operation to reduce loading on the wind turbine based on the stuck condition.

10. The system of claim 9, wherein the at least one filtering operation is based at least in part on a raw speed threshold for the running average.

11. The system of claim 9, wherein the at least one filtering operation is a first filtering operation, and wherein the one or more operations further comprise:
applying, via the controller, a second filtering operation to the running average.

12. The system of claim 11, wherein the first filtering operation is based at least in part on a threshold of a coefficient of variance in the running average and wherein the second filtering operation is based at least in part on a raw speed threshold for the running average.

13. A method for detecting when a rotor blade of a wind turbine is stuck, the method comprising:
idling the wind turbine, wherein the wind turbine has a yaw misalignment relative to an incoming wind direction;
monitoring, via a controller, a speed of rotation of the wind turbine;
determining, via the controller, a running average of the speed of rotation;
applying, via the controller, a first filtering operation to the running average to obtain a first filtered value, wherein the first filtering operation comprises comparing the running average of the speed of rotation to a threshold of a coefficient of variance in the running average of the speed of rotation;
applying, via the controller, a second filtering operation to the first filtered value to obtain a second filtered value;
determining, via the controller, a stuck condition of one or more rotor blades of the wind turbine based on the second filtered value; and
performing a control operation to reduce loading on the wind turbine based on the stuck condition.

14. The method of claim 13, wherein the second filtering operation is based at least in part on a raw speed threshold for the running average.

15. The method of claim 13, wherein the control operation comprises yawing, via the controller, the nacelle of the wind turbine away from an incoming wind direction.

16. The method of claim 15, wherein yawing the nacelle of the wind turbine further comprises continuously providing different yaw angles to one or more yaw drive mechanisms of the rotor blade.

17. The method of claim 13, wherein monitoring the speed of rotation of the wind turbine comprises continuously monitoring the speed of rotation of the wind turbine.

* * * * *